US 012056405B2

United States Patent
Kunii et al.

(10) Patent No.: US 12,056,405 B2
(45) Date of Patent: Aug. 6, 2024

(54) INFORMATION PROCESSING APPARATUS HAVING CLOUD PRINTING CAPABILITY, CONTROL METHOD OF INFORMATION PROCESSING APPARATUS, STORAGE MEDIUM, AND CLOUD PRINTING SYSTEM

(71) Applicant: CANON KABUSHIKI KAISHA, Tokyo (JP)

(72) Inventors: Shogo Kunii, Kanagawa (JP); Koichi Abe, Jiangsu (CN)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/111,952

(22) Filed: Feb. 21, 2023

(65) Prior Publication Data
US 2023/0280950 A1 Sep. 7, 2023

(30) Foreign Application Priority Data
Feb. 24, 2022 (JP) .................. 2022-026620

(51) Int. Cl.
*G06F 3/12* (2006.01)
(52) U.S. Cl.
CPC .......... *G06F 3/1229* (2013.01); *G06F 3/1203* (2013.01); *G06F 3/1287* (2013.01)
(58) Field of Classification Search
USPC ...................................... 358/1.15
See application file for complete search history.

(56) References Cited

U.S. PATENT DOCUMENTS

| 11,500,597 B2 | 11/2022 | Saigusa |
| 2011/0235085 A1* | 9/2011 | Jazayeri ............... G06F 3/1238 358/1.14 |
| 2019/0369934 A1* | 12/2019 | Inoue ................. G06F 3/1288 |
| 2020/0201585 A1* | 6/2020 | Miyajima ............ G06F 3/1207 |
| 2020/0356317 A1* | 11/2020 | Nakagawa ........... G06F 3/1267 |
| 2022/0171589 A1 | 6/2022 | Abe |

FOREIGN PATENT DOCUMENTS

JP 2021-124788 A 8/2021

* cited by examiner

*Primary Examiner* — Jacky X Zheng
(74) *Attorney, Agent, or Firm* — VENABLE LLP

(57) ABSTRACT

An information processing apparatus in a printing system including the information processing apparatus, a cloud printing service, a data conversion service, and a printing apparatus that is not compatible with the cloud printing service but can utilize the cloud printing service via the data conversion service, includes a memory containing instructions and a processor for executing the instructions to obtain printer identification information for identifying the printing apparatus in the cloud printing service, and request the data conversion service for printer status information of the printing apparatus by use of the obtained printer identification information. In addition, a display controller is configured to preform display control of the obtained printer status information.

8 Claims, 14 Drawing Sheets

```
Get-Printer-Attributes:
   attributes-charset (charset) = utf-8
   attributes-natural-language (naturalLanguage) = en
      :
   xyz-cloud-printer-id = 82032d34-50fd-4f6a-a7f8-f5ed9ee3f798
```

FIG.10

INFORMATION PROCESSING APPARATUS HAVING CLOUD PRINTING CAPABILITY, CONTROL METHOD OF INFORMATION PROCESSING APPARATUS, STORAGE MEDIUM, AND CLOUD PRINTING SYSTEM

BACKGROUND OF THE INVENTION

Field of the Invention

The present disclosure relates to a technology of a cloud printing system.

Description of the Related Art

In recent years, for example, cloud printing systems for utilizing printing services on the cloud, such as Universal Print (registered trademark) provided by Microsoft Corporation, have started to spread. Along with this, print extension applications, which extend the functions of cloud printing systems, and data conversion services, which enable printers not supported by cloud printing services to be utilized on cloud printing services, have also been spreading.

In Japanese Patent Laid-Open No. 2021-124788 (hereinafter referred to as Document 1), regarding printers registered in a server, there is a proposition of a system aiming to register capability information not provided by the printers in the server.

SUMMARY OF THE INVENTION

There is a demand for a technology for suitably obtaining status information of a printer in a cloud printing system.

An information processing apparatus according to an embodiment of the present disclosure is an information processing apparatus in a printing system including the information processing apparatus, a cloud printing service, a data conversion service, and a printing apparatus capable of utilizing the cloud printing service via the data conversion service, the information processing apparatus including: an obtainment unit configured to obtain printer identification information for identifying the printing apparatus in the printing system; a request unit configured to request the data conversion service for printer status information of the printing apparatus by use of the obtained printer identification information; and a display control unit configured to perform display control of the printer status information obtained by the request unit.

Further features of the present invention will become apparent from the following description of exemplary embodiments with reference to the attached drawings.

BRIEF DESCRIPTION OF THE DRAWINGS

FIG. 10 is a diagram representing an example of the contents of Get-Printer-Attributes;

DESCRIPTION OF THE EMBODIMENTS

Hereinafter, a detail explanation is given of embodiments of the present disclosure with reference to the attached drawings. Noted that the following embodiments are not intended to limit the present disclosure according to the claims and that every combination of the characteristics explained in the present embodiments is not necessarily essential to the solution in the present disclosure. Note that the same component elements are assigned with the same reference numbers, so that the explanations thereof are omitted.

First Embodiment

Figure 1:
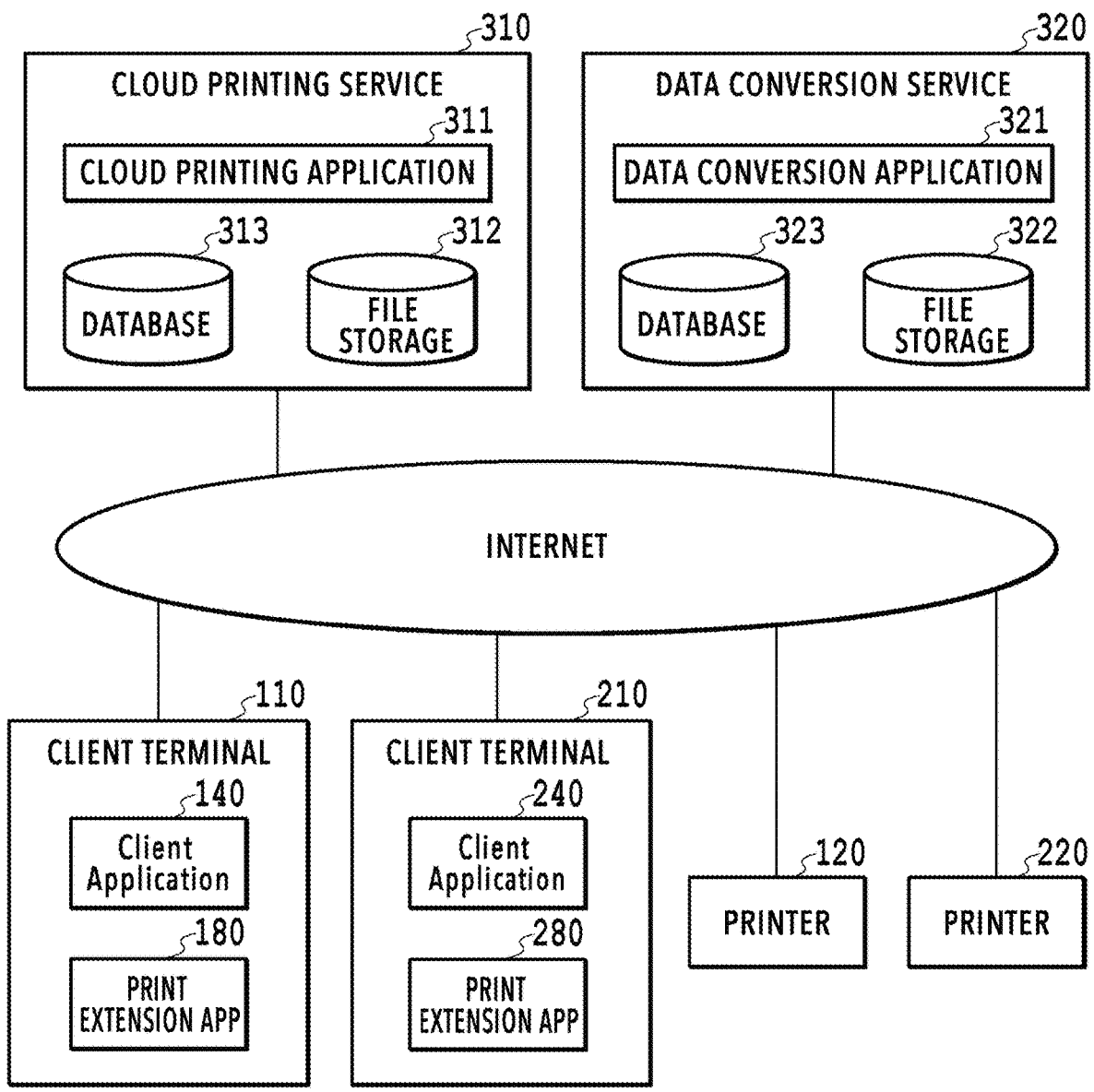
FIG. 1 is a diagram illustrating an example of a configuration of a cloud printing system.

FIG. 1 is a diagram illustrating an example of a configuration of a cloud printing system. The cloud printing system in the present embodiment includes the client terminals 110 and 210, the printers 120 and 220, the cloud printing service 310, and the data conversion service 320. Further, these are mutually connected via the Internet.

The cloud printing service 310 includes the cloud printing application 311, the file storage 312, and the database 313. In the present embodiment, as an example of the cloud printing service 310, Universal Print provided by Microsoft Corporation is assumed for the sake of explanation.

The data conversion service 320 includes the data conversion application 321, the file storage 322, and the database 323. The client terminals 110 and 210 are information processing apparatuses, which may be general personal computers (hereinafter abbreviated as PCs or computers), for example. Hereinafter, client terminals are referred to as PCs or computers. The PCs 110 and 210 are capable of connecting to the cloud printing service 310 via the Internet to utilize the service thereof.

The printers 120 and 220 are connected to the data conversion service 320 via the Internet. The data conversion service 320 converts print data (PDF file) included in a print job submitted from the cloud printing service 310 into data in a format that can be printed by the printers 120 and 220 (print setting file and PWG raster data). Further, the data conversion service 320 also has a function of obtaining status information of a printer from the printer and transmitting a printer status screen or printer status information (information such as the ink remaining amount, being online, being offline, an error, etc.) to the PCs 110 and 210. The interface between the cloud printing service 310 and the data conversion service 320 is IPP Shared Infrastructure Extensions (INFRA), which is utilized in Universal Print.

The printers 120 and 220 are printers that are not supported by the cloud printing service 310 (Universal Print) if the printers are standalone. Therefore, the printers 120 and 220 have a function of obtaining a print job including data in a printable format from the data conversion service 320 and printing out the print job. The client applications 140 and 240 are, for example, document editing applications. The print extension applications (hereinafter abbreviated as print extension apps) 180 and 280 are applications operable on information processing apparatuses for managing the printers registered in the cloud printing service 310. In the present embodiment, as an example, Print Support Application provided by Microsoft is assumed for the sake of explanation.

There are two types of authorities for users who utilize the cloud printing service 310, i.e., administrator and general user, and an administrator can register a virtual printer in the cloud printing service 310. Virtual printers are printers registered in the cloud printing service 310. In the present embodiment, as described later, in order to utilize the data conversion service 320, the cloud printing service 310 registers the data conversion service 320 as a virtual printer. In the cloud printing service 310, one virtual printer is associated with one actual physical printer (referred to as a real printer). A general user can register a real printer in the cloud printing service 310 or utilize the cloud printing service 310 to perform printing, etc. Note that the administrator's authority includes the authority of a general user.

Figure 2:
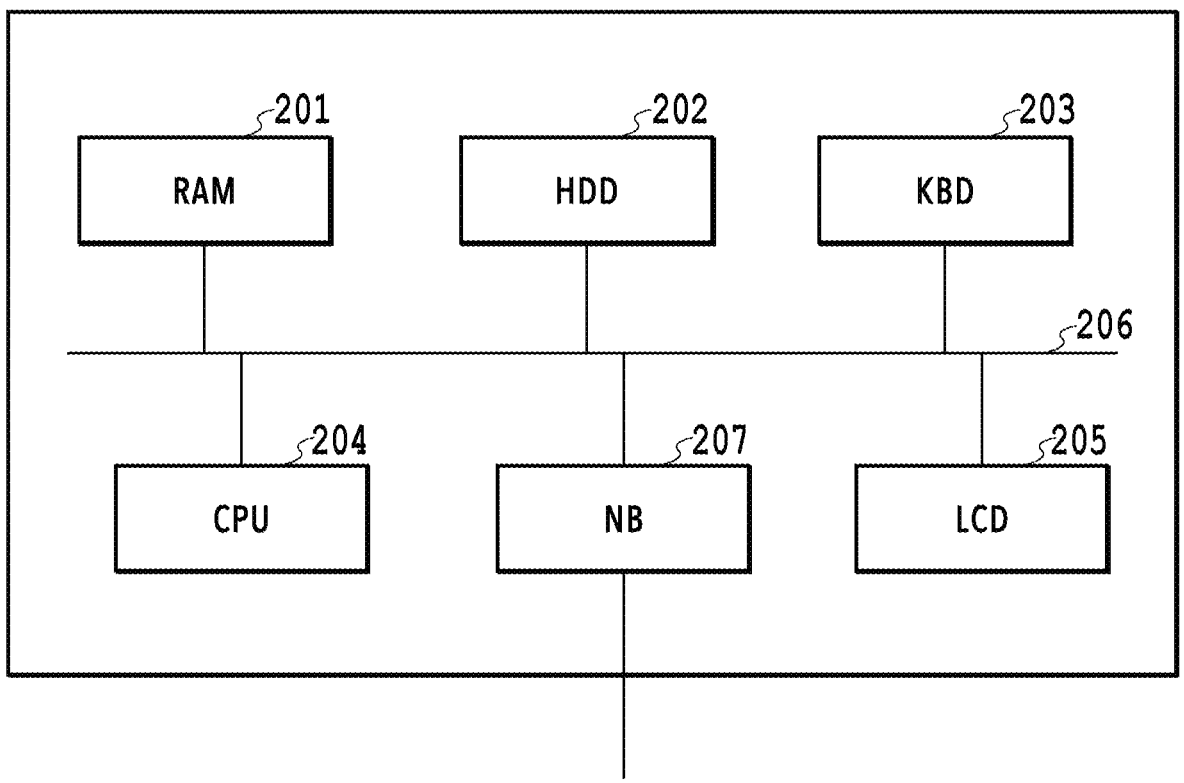
FIG. 2 is a diagram representing an example of a hardware configuration of a PC.

FIG. 2 is a diagram representing an example of a hardware configuration of a PC. In the present embodiment, the PC 210 is taken as an example for the explanation. As illustrated in FIG. 2, the PC 210 includes the RAM 201 which is a random access memory section, the HDD 202 which is a hard disk drive section, the KBD 203 which is a keyboard section, and the CPU 204. Further, the PC 210 also includes the LCD 205 which is a monitor for display, the NB 207 which is a network board, and the bus 206 which at least mutually connects the respective blocks illustrated in FIG. 2 in a communicable manner. Note that the HDD 202 is, for example, a storage section of the PC 210. Further, the storage section is not limited to this and may be a portable CD-ROM, an internally installed ROM, or the like. The KBD 203 is, for example, an input section of the PC 210. The CPU 204 is, for example, a control section of the PC 210. The LCD 205 is, for example, a display section of the PC 210 and its display control is performed by the CPU 204, the print extension application 280, or the like. The NB 207 is, for example, a communication control section of the PC 210.

The client applications 140 and 240, applications such as the web browser 83, or software are stored in the HDD 202, read out to the RAM 201 as necessary, and executed by the CPU 204, for example. Thereby, the CPU 204 implements the functions of the client applications 140 and 240, applications such as the web browser 83, or software.

Figure 3:
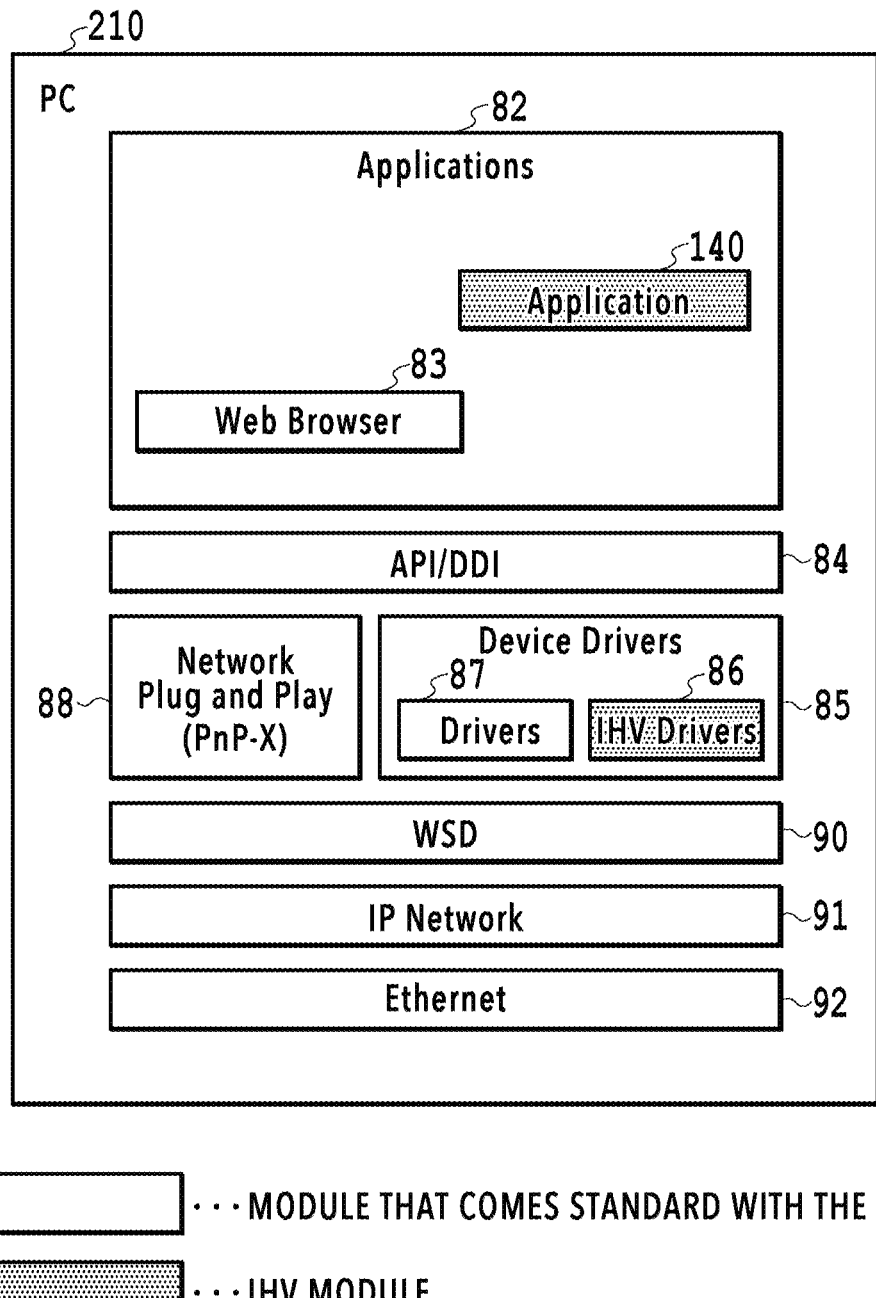
FIG. 3 is a diagram representing an example of a software module configuration of the PC.

FIG. 3 is a diagram representing an example of a software module configuration of the PC. In FIG. 3, the module 92 is an Ethernet control stack that controls Ethernet (registered trademark). The module 91 is an IP Network control stack that controls the IP Network. The module 90 is a WSD control stack that controls WSD (Web Service on Devices) that provides a device search mechanism on a network. The module 88 is a PnP-X control stack that controls network plug-and-play. Note that PnP-X is an abbreviation for Plug and Play Extensions. PnP-X is a function that comes standard with the operating system (OS) of Windows 10 (registered trademark) as a set of plug-and-play extended functions that provide support for network-connected devices. The module 85 is a device driver group, which includes the standard driver group 87 that comes standard with the OS and the IHV driver group 86 that is provided by Independent Hardware Vendor (IHV). The standard driver group 87 includes an OS standard printer driver, scanner driver, network driver, or the like. The IHV driver group 86 includes an IHV printer driver, scanner driver, network driver, or the like.

The module 84 is an application/DDI interface, which includes Application Programming Interface (API) and Device Driver Interface (DDI). The module 140 is, for example, a document editing application, and the module 83 is, for example, a web browser application. The module 82 is an application group, which includes the client application 140, the web browser 83, or the like.

In the cloud printing system, an identifier that identifies a printer (that is, a virtual printer) registered in the cloud printing service 310 is referred to as a cloud printer ID (or printer identification information). Further, the identifier of a printer in a local printing system on the Windows OS is referred to as an OS printer ID, and the values of OS printer IDs and the values of cloud printer IDs, each of which represents one printer, are different.

Generally, in a cloud printing system that includes the data conversion service 320, in a case where status information such as the ink remaining amount of a printer is displayed from the print extension app 180, the print extension app obtains the information saved in the cloud printing service 310 for the display. The printer status information possessed by the cloud printing service is information received from the data conversion service 320 and updated at a specific timing such as at the timing of printer registration or printing. Therefore, depending on the timing of the operation for checking the status information (such as pressing an update button), it may not be possible to know the latest printer status information.

In order to obtain status information of a printer in real time using an update button or the like in the print extension app 180, it is required to obtain the printer's cloud printer ID that is used to identify the printer on the cloud printing system. If the print extension app 180 can obtain the cloud printer ID, it becomes possible to directly request the data conversion service 320 for the printer status information.

In the following embodiment, a method for the print extension app 180 to obtain the cloud printer ID and display the status information of the printer in real time is explained. Note that, in the present embodiment, it is assumed that the cloud printing service 310 is utilized by the printer 120 that is not supported by the cloud printing service 310. Thus, a method of registering a printer or displaying printer status via the data conversion service 320 is explained.

Figure 4:
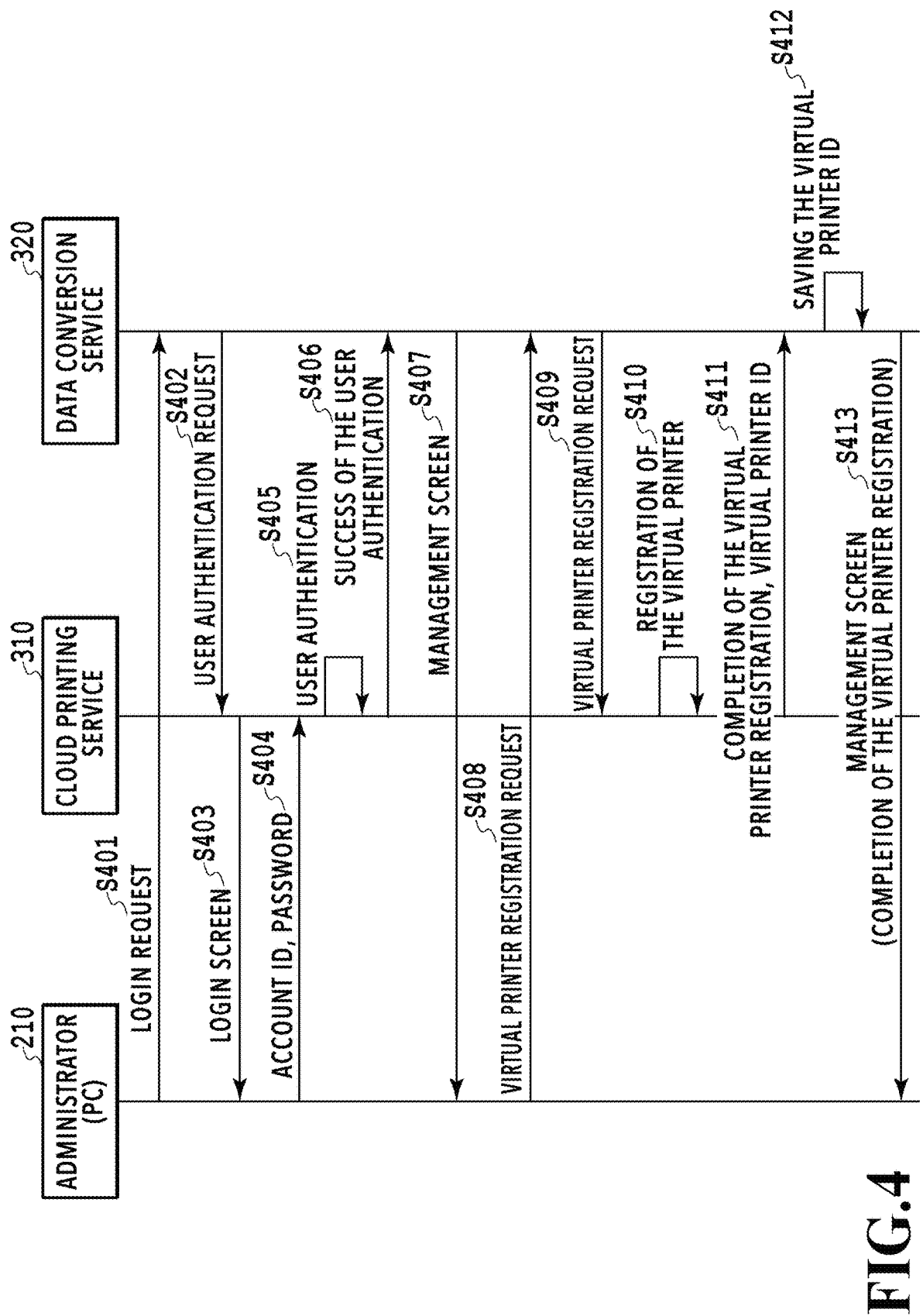
FIG. 4 is a diagram representing an example of a sequence diagram in which an administrator registers a virtual printer.

FIG. 4 is a diagram representing an example of a sequence diagram in which an administrator registers a virtual printer. The series of processes illustrated in the sequence of FIG. 4 is performed by the respective CPUs of the PC 210, cloud printing service 310, and data conversion service 320 loading program codes stored in a disk device, etc., into a RAM and executing the program codes. Note that the symbol "S" in the explanation of each process below means that it is a step in the flowchart, and the same applies to the following embodiments. Further, as explained above, in the present embodiment, it is assumed that a printer that is not supported by the cloud printing service is registered in the cloud printing service via the data conversion service 320. Therefore, in the present embodiment, the data conversion service 320 provides the PC 110 with a management screen for printer registration.

First, in S401, the PC 210 executes a login request to the data conversion service 320. This is executed if an administrator presses a login button on the initial screen (not illustrated in the drawings), which is provided by the data conversion service 320 and displayed on the web browser 83 in the PC 210. In S402, the data conversion service 320 transmits a user authentication request to the cloud printing service 310.

In S403, the cloud printing service 310 transmits a login screen to the PC 210 used by the administrator in response to this user authentication request. Note that, since the account ID and password are managed by the cloud printing service 310, the cloud printing service 310 performs the user authentication. Therefore, the login screen is also provided by the cloud printing service 310. Accordingly, the login screen (not illustrated in the drawings) is displayed on the web browser 83 in the PC 210. In S404, if the administrator inputs the account ID and password on the login screen and presses the login button, the PC 210 transmits the account ID and password to the cloud printing service 310.

In S405, the cloud printing service 310 searches the database 313 with the account ID and password to perform the user authentication. If the account ID and password are correct, the cloud printing service 310 transmits information representing success of the user authentication to the data conversion service 320 in S406.

In S407, the data conversion service 320 transmits the management screen to the PC 210. In S408, the PC 210 displays the management screen on the web browser 83 in the PC 210, and, if the administrator requests for registration of a virtual printer from this management screen, the PC 210 transmits a virtual printer registration request to the data conversion service 320.

Upon receiving the virtual printer registration request, the data conversion service 320 transmits the virtual printer registration request to the cloud printing service 310 in S409. In S410, the cloud printing service 310 generates a virtual printer ID, with which the data conversion service 320 is set as a virtual printer, and registers the virtual printer ID in the database 313. In S411, the cloud printing service 310 transmits information representing completion of the virtual printer registration and the virtual printer ID to the data conversion service 320.

In S412, the data conversion service 320 saves the virtual printer ID in the database 323. Further, in S413, the data conversion service transmits a management screen representing the completion of the virtual printer registration to the PC 210. If the PC 210 receives this information, the management screen including information about the registered virtual printer is displayed on the web browser 83 in the PC 210.

Figure 5:
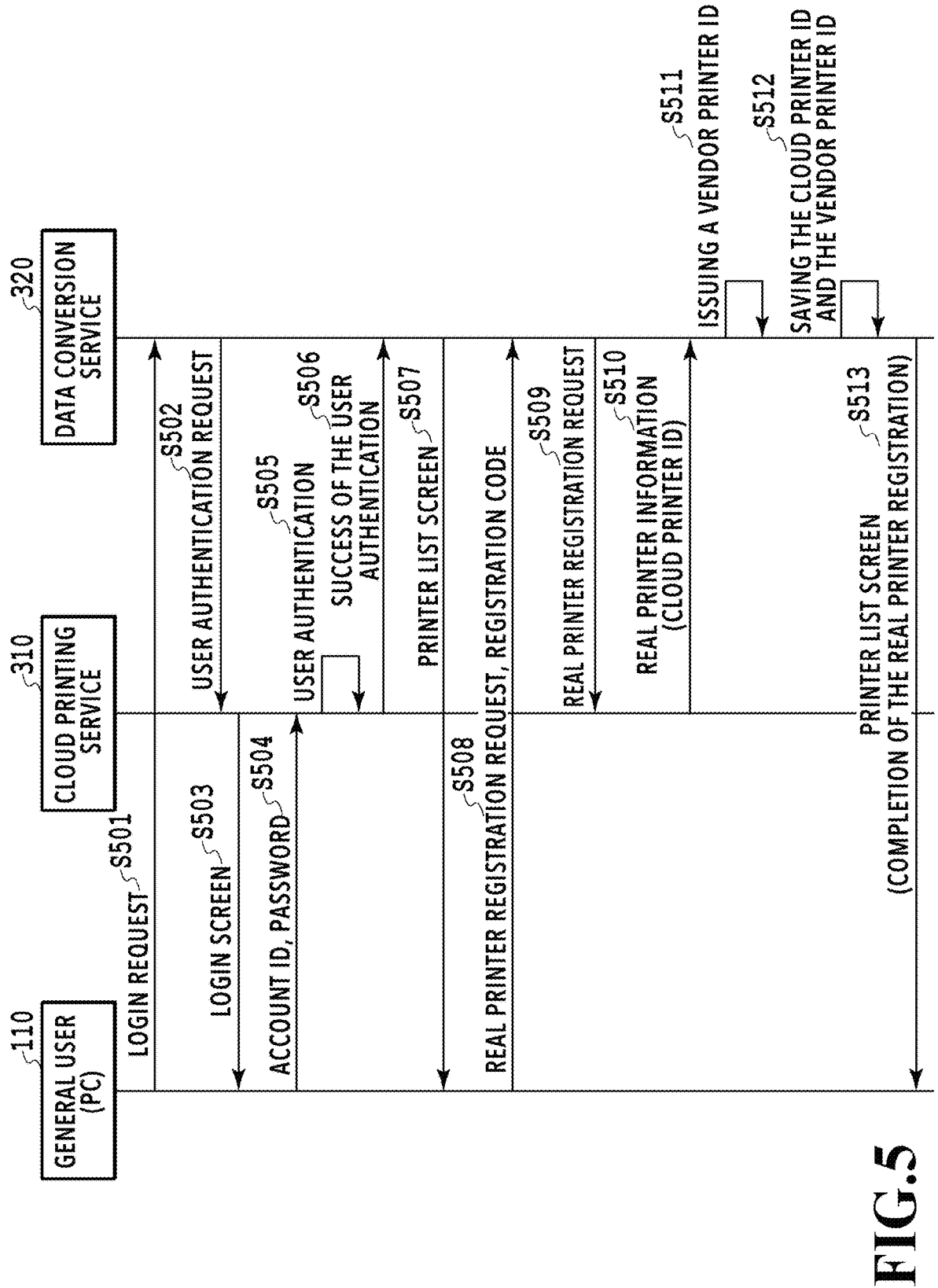
FIG. 5 is a diagram representing an example of a sequence diagram in which a general user registers a real printer.

FIG. 5 is a diagram representing an example of a sequence diagram in which a general user registers a real printer. The series of processes illustrated in the sequence of FIG. 5 is performed by the respective CPUs of the PC 110, cloud printing service 310, data conversion service 320, and printer 120 loading program codes stored in a disk device, etc., into a RAM and executing the program codes.

The printer 120 has a function of issuing a registration code, which is used at the later-described timing of registering a real printer, in a case where the printer 120 is utilized in a cloud printing system. With the present diagram, the explanation starts from the scene after a general user operates the operation screen of the printer 120 and obtains a registration code in order to utilize a cloud printing system.

First, in S501, the PC 110 executes a login request to the data conversion service 320. This is executed if a general user presses a login button on the initial screen, which is provided by the data conversion service 320 and displayed on the web browser 83 in the PC 110. In S502, the data conversion service 320 transmits a user authentication request to the cloud printing service 310.

In S503, the cloud printing service 310 transmits a login screen to the PC 110 used by the general user in response to this user authentication request, and thereby the login screen is displayed on the web browser 83 in the PC 110. In S504, if the general user inputs the account ID and password on the login screen and presses the login button, the PC 110 transmits the account ID and password to the cloud printing service 310.

In S505, the cloud printing service 310 searches the database 313 with the account ID and password to perform the user authentication. If the account ID and password are correct, the cloud printing service 310 transmits information representing success of the user authentication to the data conversion service 320 in S506.

In S507, the data conversion service 320 transmits a printer list screen to the PC 110. In S508, the PC 110 transmits a real printer registration request including a virtual printer ID and a registration code to the data conversion service 320. Specifically, the general user selects a virtual printer (that is, the data conversion service 320) registered as in FIG. 4 from the printer list screen. Further, if the general user inputs the registration code issued by the printer 120 for the selected virtual printer, the PC 110 transmits a real printer registration request for associating the selected virtual printer and the printer 120. That is, a request for associating the data conversion service 320, which is a virtual printer, and the printer 120, which is a real printer, with the cloud printing service is transmitted. Thus, in S509, the data conversion service 320 transmits the real printer registration request to the cloud printing service 310.

In S510, the cloud printing service 310 generates a cloud printer ID that identifies the real printer in the cloud printing service 310. Further, the cloud printer ID is registered in the database 313 and this cloud printer ID is transmitted to the data conversion service 320. In S511, the data conversion service 320 issues a vendor printer ID for identifying the printer 120 from among one or more printers connected to the data conversion service 320 but not supported by the cloud printing service 310. This printer 120 is a printer corresponding to the registration code transmitted from the PC 110 in S508. Further, in S512, the data conversion service 320 saves the cloud printer ID and the vendor printer ID in the database 323 in association with each other. Accordingly, in the data conversion service 320, if the cloud printer ID is designated by the cloud printing service 310, the printer 120 that is a real printer can be identified based on the vendor printer ID. In S513, the data conversion service 320 transmits a printer list screen representing completion of the real printer registration to the PC 110.

Figure 6:
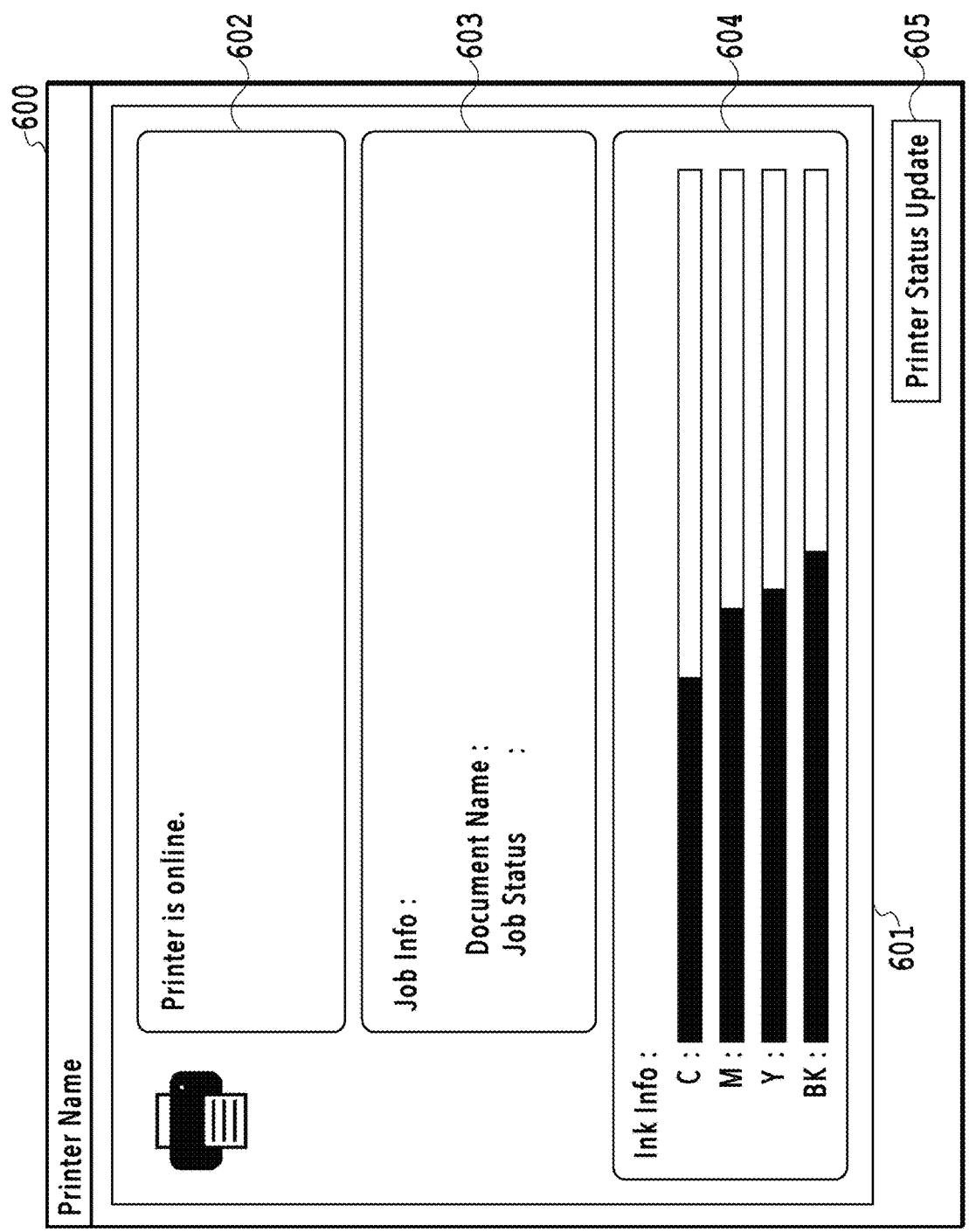
FIG. 6 is a diagram representing an example of a printer status display screen to be displayed.

FIG. 6 is a diagram representing an example of a printer status display screen displayed by the print extension app. The printer status display screen 600 has the display area 601 and the update button 605. Further, the display area 601 includes the printer status display section 602, the print job information display section 603, and the printer ink remaining amount display section 604.

Note that the display area 601 may function as a Web View display section that displays a status screen provided by the data conversion service 320 or the cloud printing service 310 using a web browser function. Further, the display area 601 may display a display screen for which display control is performed based on printer status information received from the data conversion service 320 or the cloud printing service 310.

Further, in a case where multiple printers are registered in the cloud printing system, it is also possible that a tab (not illustrated in the drawings) is provided for each printer on the printer status display screen 600, etc., so as to manage the multiple printers on one display screen.

Figure 7:
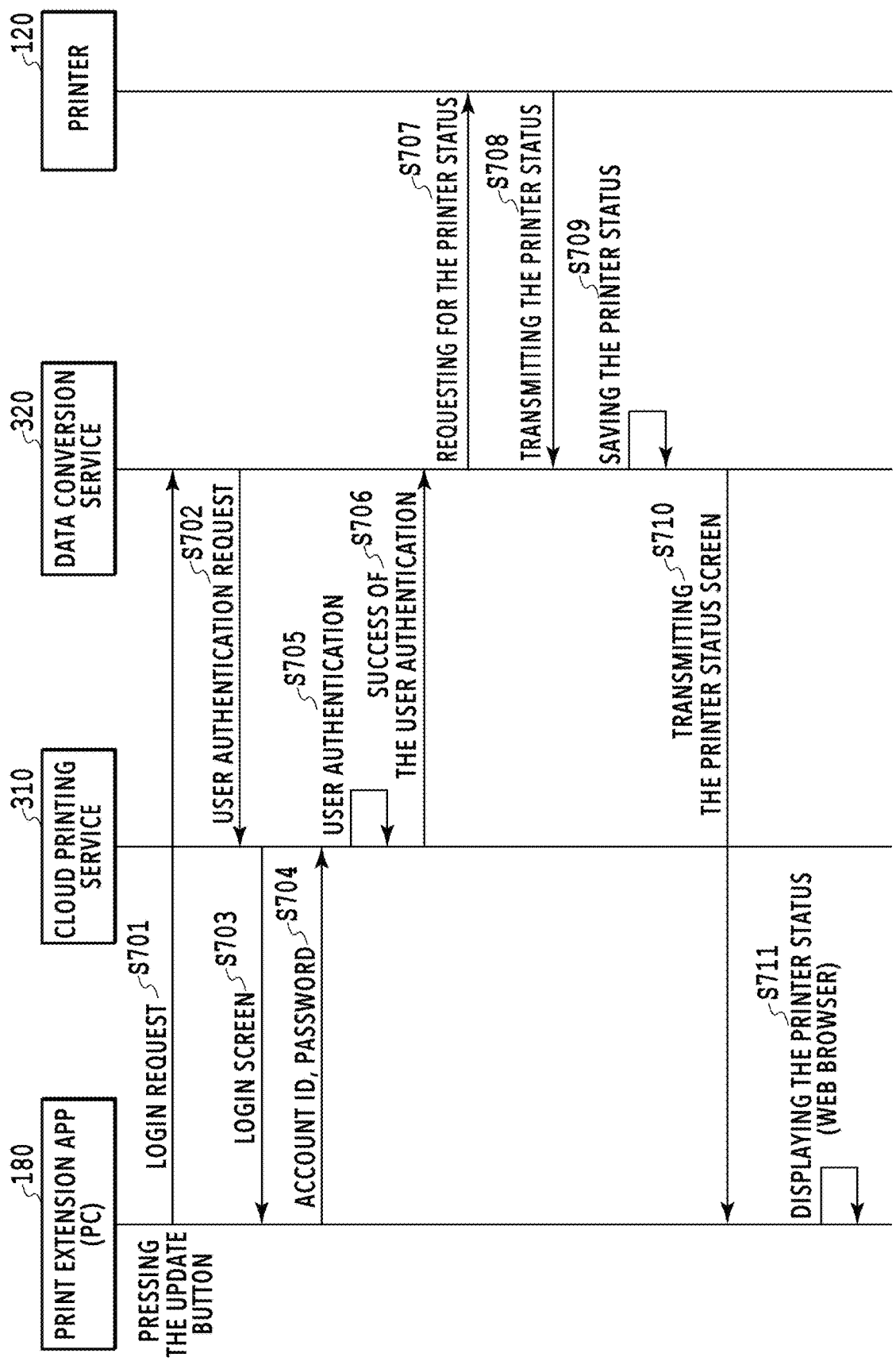
FIG. 7 is a diagram representing an example of a sequence diagram of processing for displaying a status of a printer.

FIG. 7 is a sequence diagram illustrating an overview of the processing in which the print extension app 180 displays a status of a printer. With the present diagram, an explanation is given of the processing for displaying a status screen of the printer 120 by causing the display area 601 in the print extension app 180 to function as a Web View display section. The present processing starts in a case where an update button is pressed on a management screen of the printer 120, which is provided by the print extension app 180. In FIG. 7, since the series of processes for user authentication in S701 to S706 is the same as the processes of S501 to S506 in FIG. 5, the explanation thereof is omitted here. Further, in S701, although the print extension app 180 designates a cloud printer ID to the data conversion service 320 and requests for the status of the printer 120, the explanations thereof are omitted in the present sequence diagram. Details of the process of designating a cloud printer ID for the printer status request is described later with reference to the flowcharts of FIG. 11 and the subsequent diagrams. Note that the same applies to the later-described sequence diagrams of FIG. 8 and FIG. 9.

In S707, the data conversion service 320 transmits a printer status request to the printer 120. In S708, the printer 120 transmits the printer status to the data conversion service 320. In S709, the data conversion service 320 receives the printer status and saves the printer status in the database 323. Further, in S710, the data conversion service 320 transmits the printer status screen to the PC 110.

In S711, the print extension app 180 in the PC 110 receives the printer status screen and utilizes the web browser function in the print extension app 180 to display the printer status. Note that, in S711, it is also possible that the print extension app 180 launches the web browser 83 in the PC 110 to display the printer status screen on the web browser 83.

Figure 8:
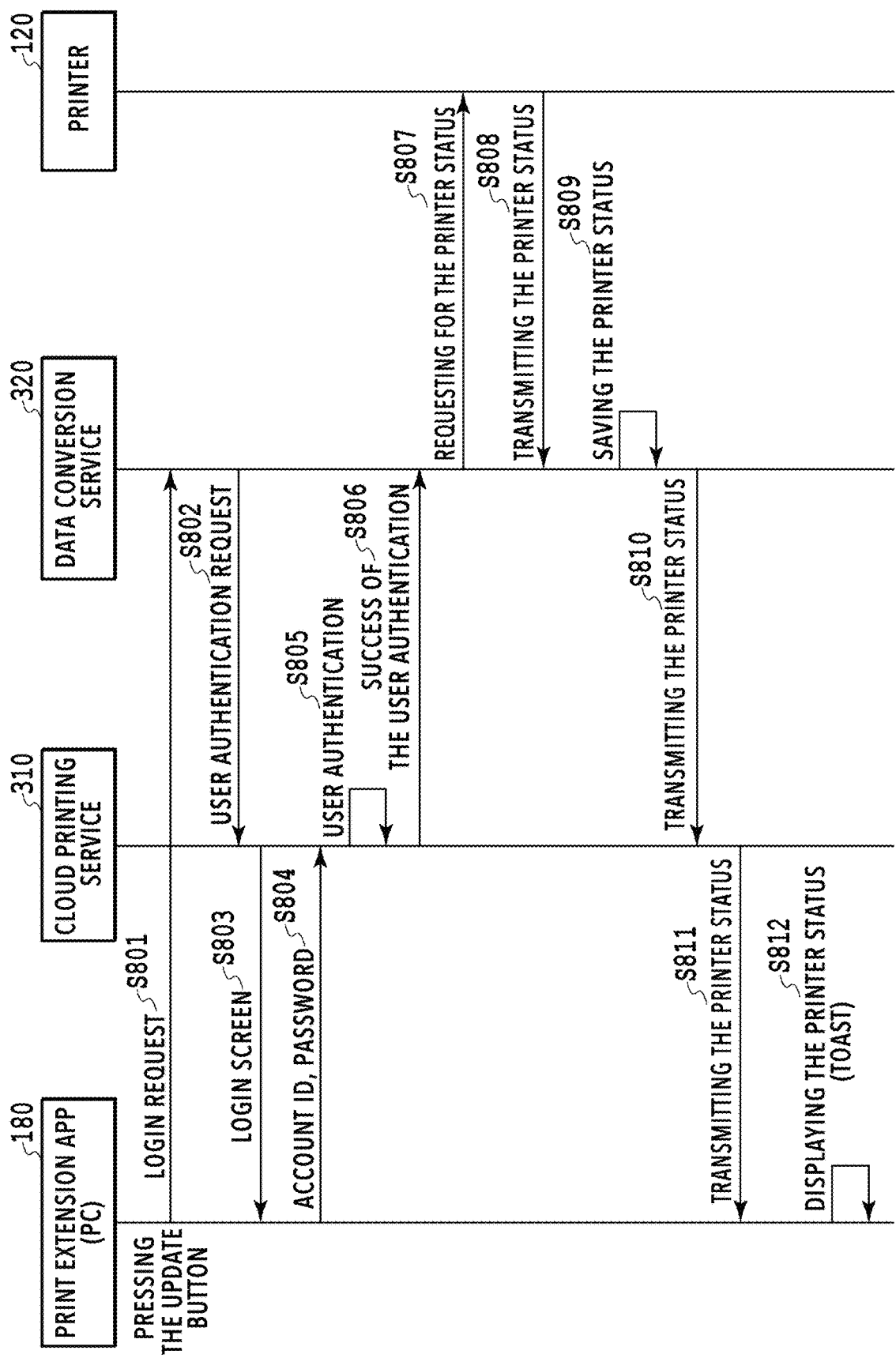
FIG. 8 is a diagram representing an example of a sequence diagram of processing for displaying a status of a printer.

FIG. 8 is a diagram representing an example of a sequence diagram of the processing in which the print extension app 180 displays a status of a printer. With the present diagram, an explanation is given of the processing in which the print extension app 180 displays status information of the printer 120, which is transmitted from the data conversion service 320, by use of a toast notification function of the PC 110. The present processing starts in a case where an update button is pressed on a management screen of the printer 120, which is provided by the print extension app 180. In FIG. 8, since the series of processes for user authentication in S801 to S806 is the same as the processes of S501 to S506 in FIG. 5, the explanation thereof is omitted. Further, since the series of processes of requesting, receiving, and saving a printer status in S807 to S809 is the same as the processes of S707 to S709 in FIG. 7, the explanation thereof is omitted.

In S810, the data conversion service 320 utilizes the INFRA mechanism to transmit the printer status to the cloud printing service 310. Further, in S811, the cloud printing service 310 utilizes the INFRA mechanism to transmit the printer status to the PC 110. In S812, the PC 110 utilizes a toast notification function of the Windows OS to display the printer status. Note that, in the present embodiment, although the example in which the latest printer status information is shared in the order of the data conversion service, cloud printing service, and PC 110 has been described as a general flow of processing, there is not a limitation as such. For example, it is also possible that the PC 110 receives status information from the data conversion service 320 in S811.

Figure 9:
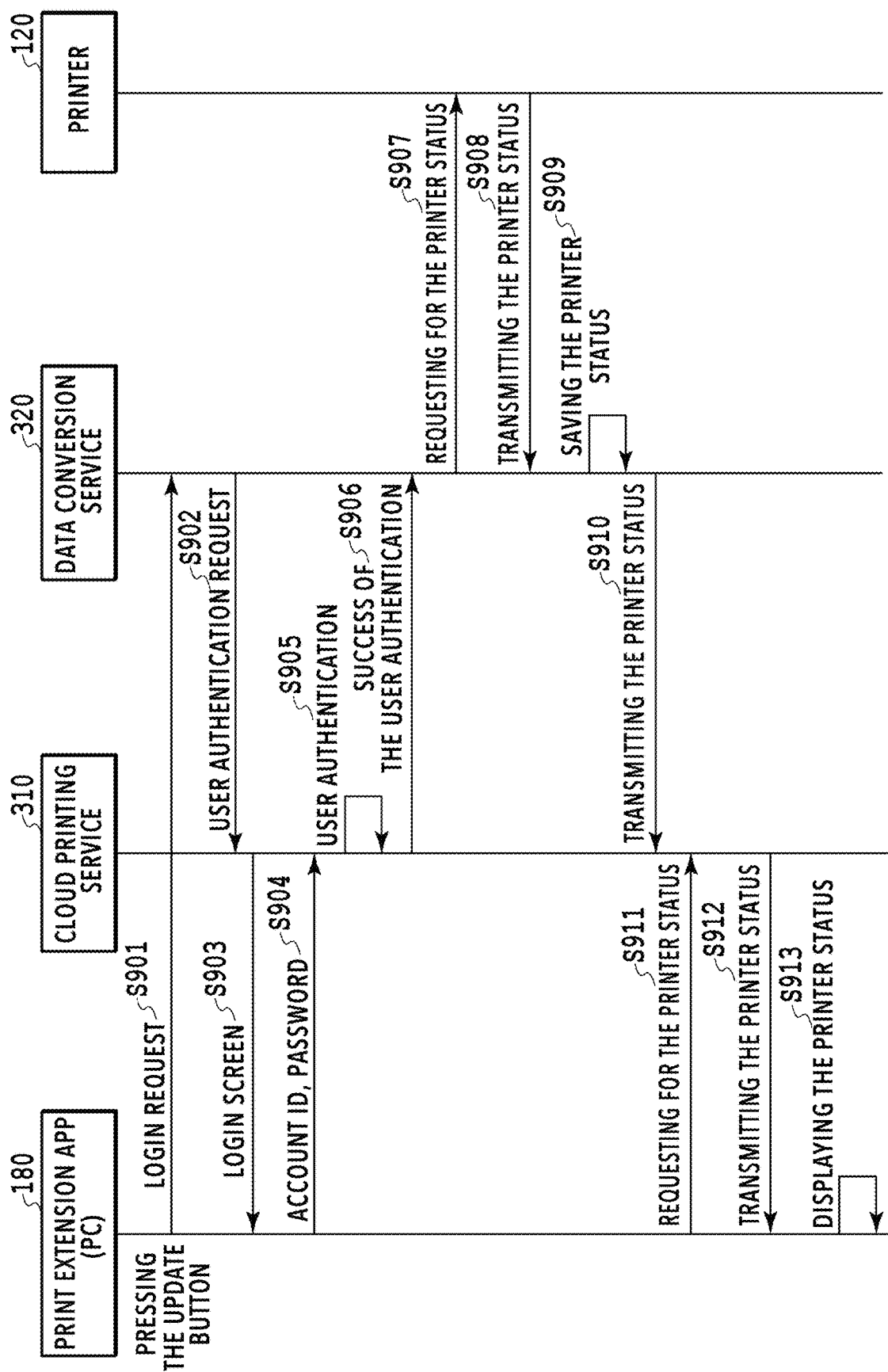
FIG. 9 is a diagram representing an example of a sequence diagram of processing for displaying a status of a printer.

FIG. 9 is a diagram representing an example of a sequence diagram of the processing in which the print extension app 180 displays a status of a printer. With the present diagram, an explanation is given of a flow of the processing in which the print extension app 180 displays the printer status in the display area 601 in the print extension app 180. The present processing starts in a case where an update button is pressed on a management screen of the printer 120, which is provided by the print extension app 180. In FIG. 9, since the series of processes for user authentication in S901 to S906 is the same as the processes of S501 to S506 in FIG. 5, the explanation thereof is omitted. Further, since the series of processes of requesting, receiving, and saving a printer status in S907 to S909 is the same as the processes of S707 to S709 in FIG. 7, the explanation thereof is omitted.

In S910, the data conversion service 320 utilizes the INFRA mechanism to transmit the printer status to the cloud printing service 310. In S911, the PC 110 utilizes the INFRA mechanism to transmit a printer status request to the cloud printing service 310. In S912, the cloud printing service 310 utilizes the INFRA mechanism to transmit the printer status to the PC 110. In S913, the print extension app 180 in the PC 110 displays the printer status in the display area 601.

Note that, although the PC 110 transmits a printer status request to the cloud printing service 310 to obtain the printer status from the cloud printing service 310 in S911 and S912, there is not a limitation as such. For example, it is also possible that the print extension app 180 in the PC 110 transmits a printer status request to the data conversion service 320 to obtain the printer status from the data conversion service 320.

FIG. 10 is a diagram representing an example of the contents of Get-Printer-Attributes. The xyz-cloud-printer-id key is a cloud printer ID key representing a cloud printer ID, which is utilized as a key to be designated at the timing of requesting for information such as the printer status in Get-Printer-Attributes. Further, the xyz-cloud-printer-id key is utilized to refer to the value of a key in information obtained at the timing of obtaining information such as Get-Printer-Attributes. In FIG. 10, as an example, "82032d34-50fd-4f6a-a7f8-f5ed9ee3f798" is set as the value of the cloud printer ID key with which the printer 120 is associated. In the present embodiment, the example in which the cloud printer ID is in a GUID format is illustrated.

Figure 11:
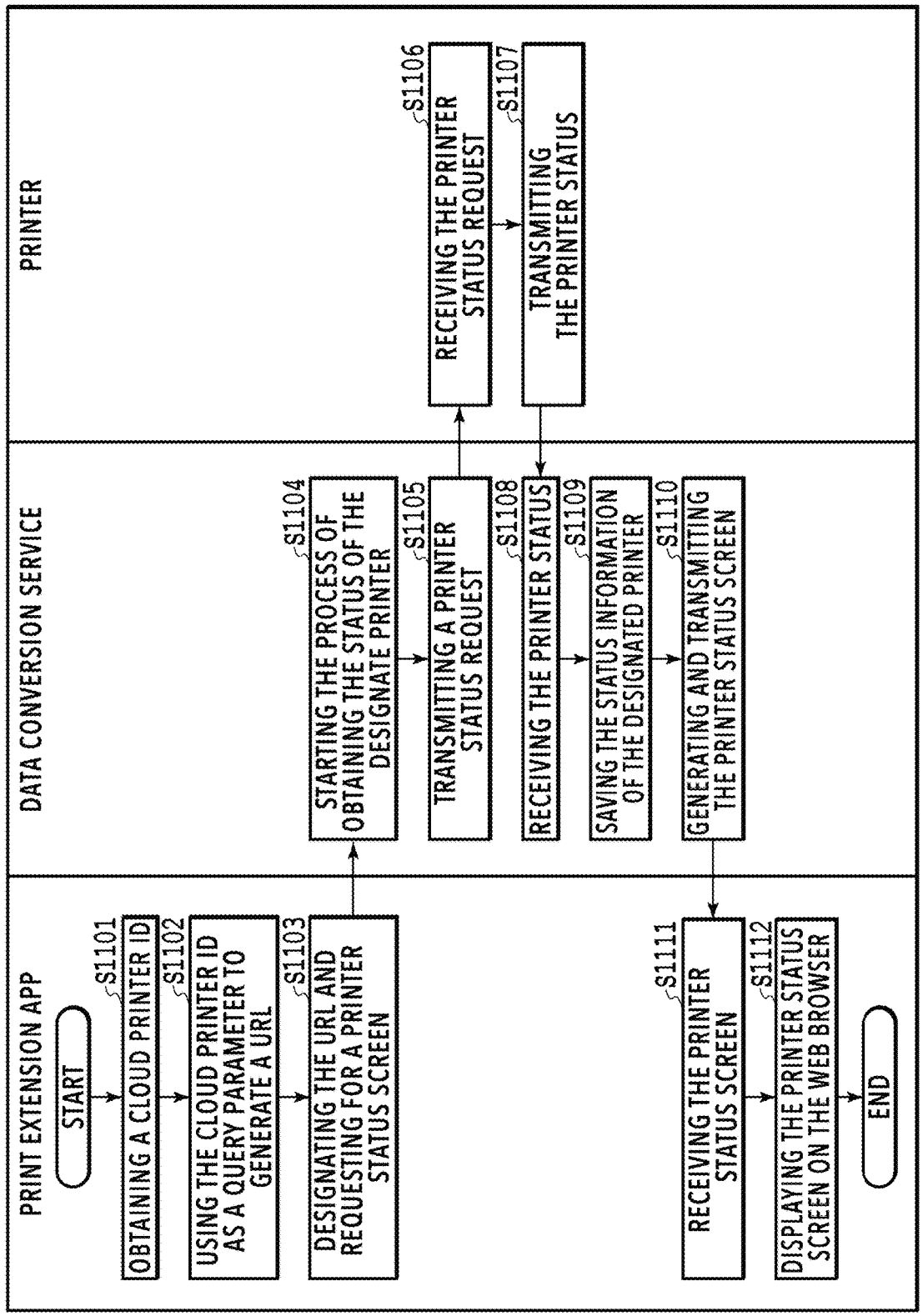
FIG. 11 is a diagram representing an example of a flowchart of processing for displaying a status of a printer.

FIG. 11 is a diagram representing an example of a flowchart of the processing in which the print extension app 180 displays a status of a printer. With the present diagram, an explanation is given of the processing for displaying a status screen of the printer 120 by causing the display area 601 in the print extension app 180 to function as a Web View display section. The series of processes illustrated in the flowchart of FIG. 11 is performed by the respective CPUs of the PC 110, data conversion service 320, and printer 120 loading program codes stored in a disk device, etc., into a RAM and executing the program codes. The present flowchart starts in a case where the print extension app 180 is launched by a general user and the update button 605 is pressed. Further, in the present embodiment, the explanation of the process for user authentication between the PC 110 and the data conversion service 320 is omitted since the process is explained with the sequence diagram of FIG. 7.

In S1101, the print extension app 180 designates the cloud printer ID key (xyz-cloud-printer-id) by use of the API of the OS to obtain the value of the cloud printer ID. Details of the process in which the print extension app 180 obtains the cloud printer ID are described later with reference to FIG. 14.

In S1102, the print extension app 180 generates a URL for designating a printer status screen (web page) of the data conversion service 320 using the obtained cloud printer ID value as a query parameter. In S1103, the print extension app 180 designates the URL and requests the data conversion service 320 for the printer status screen. In S1104, the data conversion service 320 obtains the cloud printer ID designated with the query parameter of the URL. Further, the data conversion service 320 refers to the database 323 to identify the printer associated with the obtained cloud printer ID and starts the process of obtaining the status of the identified printer. In the present embodiment, it is assumed that the printer 120 has been identified.

In S1105, the data conversion service 320 transmits a printer status request to the printer 120. In S1106, the printer 120 receives the printer status request. Further, in S1107, the printer 120 transmits the printer status of itself to the data conversion service 320.

In S1110, the data conversion service 320 receives the printer status. Further, in S1109, the data conversion service 320 saves the status information of the designated printer (printer 120) in the database 323. In S1110, the data conversion service 320 generates a printer status screen and transmits this printer status screen to the print extension app 180. In S1111, the print extension app 180 receives the printer status screen. Further, in S1112, the print extension app 180 displays the printer status screen in the display area 601 of the display screen 600. Thereafter, the present processing ends. Note that, in S1112, it is also possible that the print extension app 180 launches the web browser 83 in the PC 110 to display the printer status screen on the web browser 83.

Figure 12:
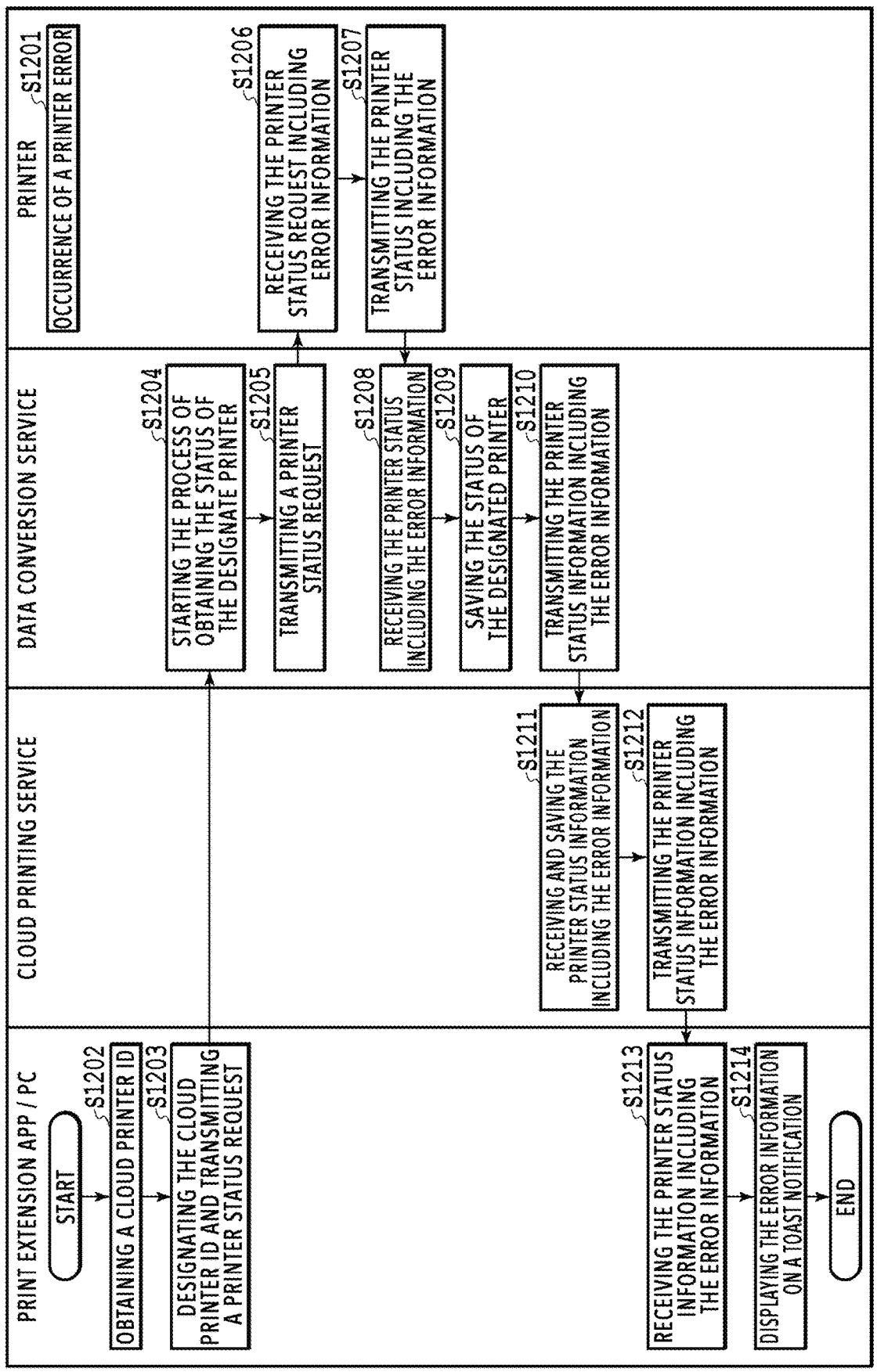
FIG. 12 is a diagram representing an example of a flowchart of processing for displaying a status of a printer.

FIG. 12 is a diagram representing an example of a flowchart of the processing in which a PC displays the status of a printer. With the present diagram, an explanation is given of the processing in which the print extension app 180 displays printer status information of the printer 120, which is transmitted from the data conversion service 320, by use of a toast notification function of the PC 110. The series of processes illustrated in the flowchart of FIG. 12 is performed by the respective CPUs of the PC 110, cloud printing service 310, data conversion service 320, and printer 120 loading program codes stored in a disk device, etc., into a RAM and executing the program codes. The present flowchart starts in a case where the print extension app 180 is launched by a general user and the update button 605 is pressed. Note that it is assumed that some error has occurred in the printer in S1201.

In S1202, the print extension app 180 obtains a cloud printer ID. In S1203, the print extension app 180 designates the cloud printer ID obtained in S1202 and transmits a printer status request to the data conversion service 320.

In S1204, the data conversion service 320 refers to the database 323 to identify the printer associated with the designated cloud printer ID and starts the process of obtaining the status of the printer. In the present embodiment, it is assumed that the printer 120 has been identified. In S1205, the data conversion service 320 transmits a printer status request to the printer 120.

In S1206, the printer 120 receives the printer status request. Further, in S1207, the printer 120 transmits printer status information of itself including error information to the data conversion service 320. In S1208, the data conversion service 320 receives the printer status including the error information and saves the printer status information of the designated printer (printer 120) in the database 323.

In S1210, the data conversion service 320 utilizes the INFRA mechanism to transmit the printer status information including the error information to the cloud printing service 310 by use of Get-Printer-Attributes. In S1211, the cloud printing service 310 receives the printer status information including the error information and saves the printer status information in the database 313.

In S1212, the cloud printing service 310 transmits the printer status information including the error information to the PC 110. In S1213, the PC 110 utilizes the INFRA mechanism to receive the printer status information including the error information by use of Get-Printer-Attributes. In S1214, the PC 110 utilizes the toast notification function of the Windows OS to display the error information. Thereafter, the present processing ends. Note that, in S1214, it is also possible that the PC 110 provides a notification of information other than the error information by use of the toast function. For example, it is also possible to notify that the printer 120 is about to run out of ink.

Figure 13:
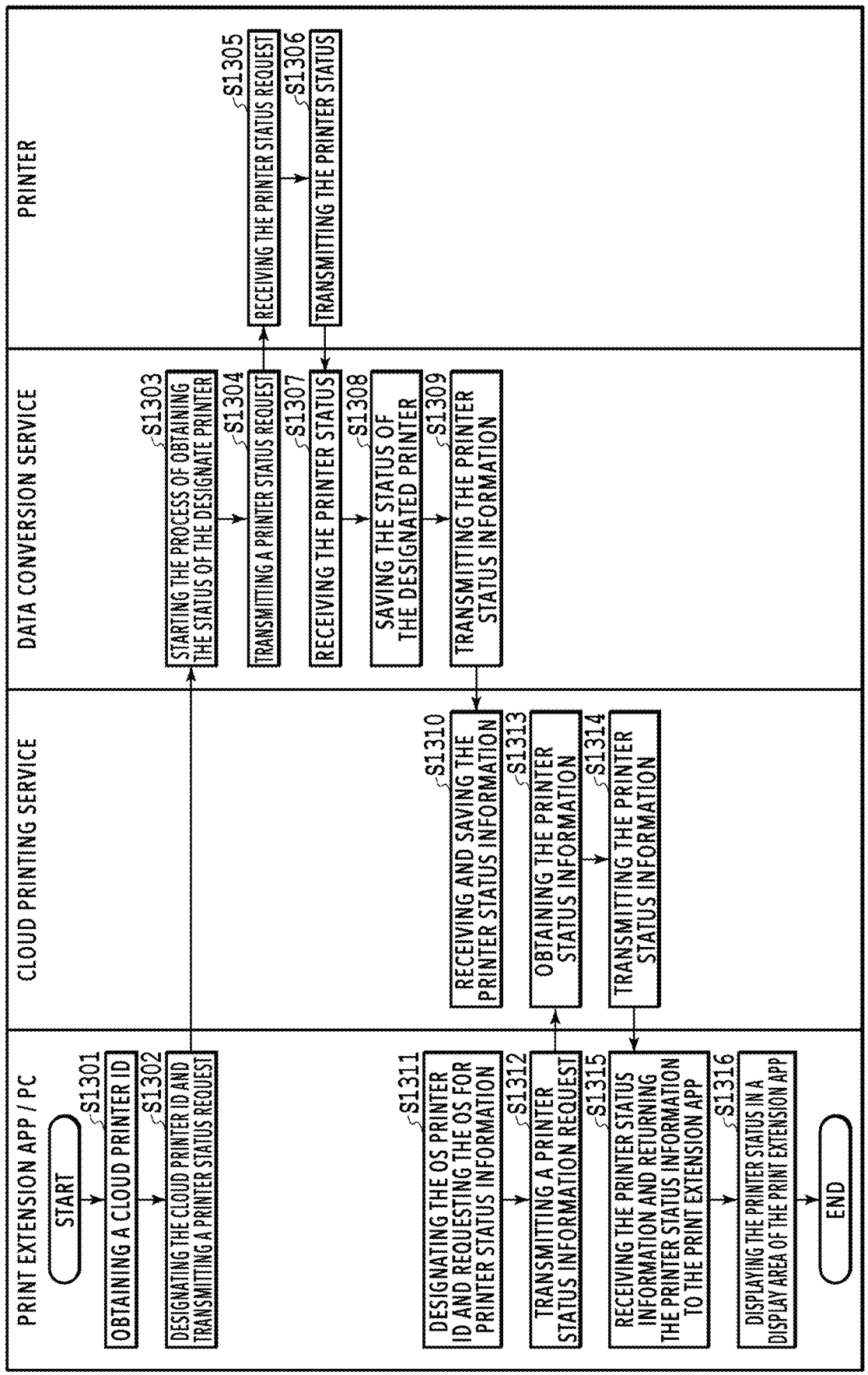
FIG. 13 is a diagram representing an example of a flowchart of processing for displaying a status of a printer.

FIG. 13 is a diagram representing an example of a flowchart of the processing in which the print extension app 180 displays a status of a printer. With the present diagram, an explanation is given of the processing in which the PC 110 utilizes the INFRA mechanism to obtain status information of a printer and displays the printer status in the display area 601 of the print extension app 180. Note that, since the processes of S1301 to S1304 are the same as the processes of S1202 to S1205 in FIG. 12, the explanations thereof are omitted.

In S1305, the printer 120 receives a printer status request. Further, in S1306, the printer 120 transmits the printer status of itself to the data conversion service 320. In S1307, the data conversion service 320 receives the printer status. Further, in S1308, the data conversion service 320 saves the status information of the designated printer (printer 120) in the database 323.

In S1309, the data conversion service 320 utilizes the INFRA mechanism to transmit the printer status information to the cloud printing service 310 by use of Get-Printer-Attributes. In S1310, the cloud printing service 310 receives the printer status information and saves the printer status information in the database 313.

In S1311, the print extension app 180 designates an identifier (OS printer ID) representing the printer 120 within the Windows OS to request the Windows OS (the PC 110) for the printer status information. The PC 110 can identify the printer 120 from the obtained OS printer ID. In S1312, the PC 110 utilizes the INFRA mechanism to transmit a printer status request to the cloud printing service 310 by use of Get-Printer-Attributes. That is, the Windows OS in the PC 110 designates the printer 120 and transmits the printer status request to the cloud printing service 310. In S1313, the cloud printing service 310 refers to the database 313 to obtain printer status information of the printer 120. Further, in S1314, the cloud printing service 310 transmits the printer status information of the printer 120 to the PC 110.

In S1315, the PC 110 receives the printer status information, and the Windows OS in the PC 110 returns the printer status information to the print extension app 180. In S1316, the print extension app 180 displays the printer status in the display area 601. Thereafter, the present processing ends. Note that, also in the present embodiment, although the PC 110 requests the cloud printing service 310 for printer status information in S1312, there is not a limitation as such, and it is also possible that the PC 110 requests the data conversion service 320 for the printer status information to receive the printer status information. This is because both of them have the latest printer status information, which is transmitted by the printer 120 in S1306.

Figure 14:
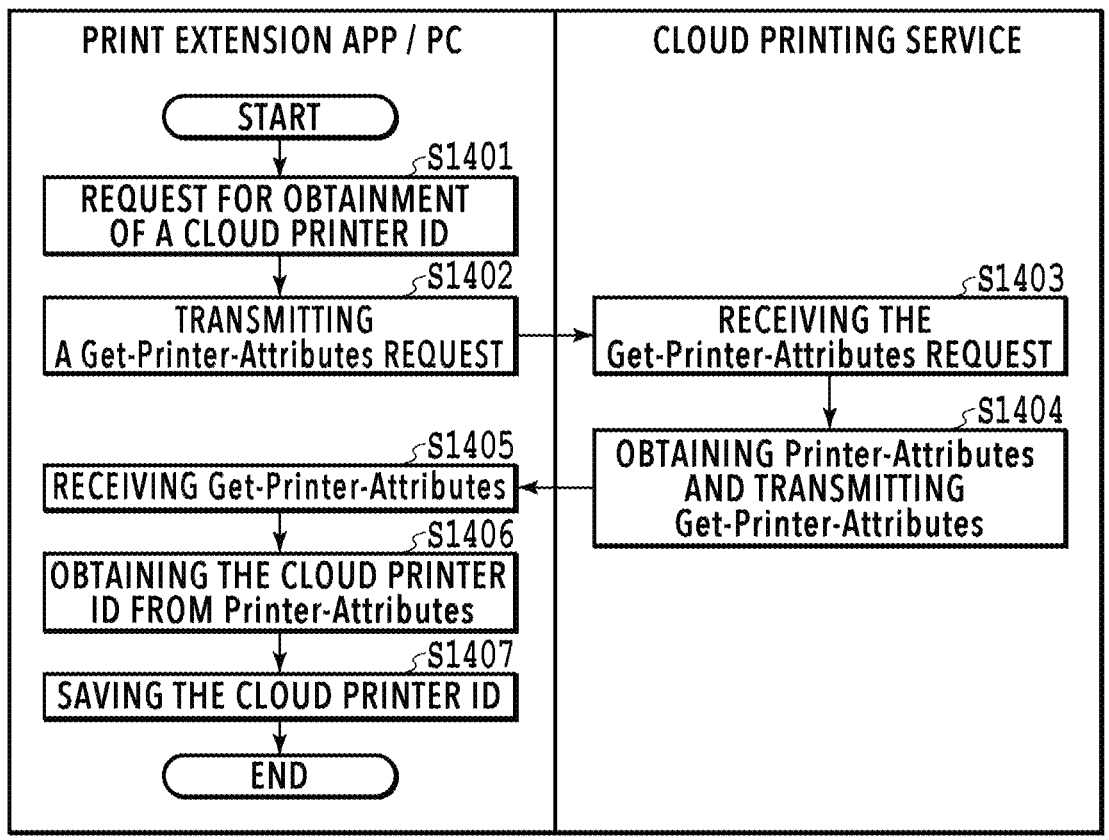
FIG. 14 is a diagram representing an example of a flowchart of processing for obtaining a cloud printer ID.

FIG. 14 is a diagram representing an example of a flowchart of the processing in which the print extension app 180 obtains a cloud printer ID. That is, the present processing is a detail of the processes of S1101, S1202, and S1301 in FIG. 11, FIG. 12, and FIG. 13.

In S1401, the print extension app 180 requests the Windows OS (the PC 110) to obtain the cloud printer ID of the printer 120. Here, the print extension app 180 designates the identifier (OS printer ID) representing the printer 120 within the Windows OS and the cloud printer ID key (xyz-cloud-printer-id) for the request to obtain the cloud printer ID of the printer 120. In S1402, the PC 110 utilizes the INFRA mechanism to transmit a Get-Printer-Attributes request to the cloud printing service 310.

In S1403, the cloud printing service 310 receives the Get-Printer-Attributes request. In S1404, the cloud printing service 310 refers to the database 313 to obtain information to be set in Printer-Attributes (that is, the cloud printer ID of the printer 120). Further, a value indicating the cloud printer ID of the printer 120 is set to xyz-cloud-printer-id of Printer-Attributes, and Get-Printer-Attributes is transmitted to the PC 110.

In S1405, the PC 110 receives Get-Printer-Attributes. In S1406, the Windows OS in the PC 110 obtains the cloud printer ID from Printer-Attributes and returns the cloud printer ID to the print extension app 180. In S1407, the print extension app 180 obtains the cloud printer ID returned from the Windows OS and saves the cloud printer ID in the HDD 202. Thereafter, the present processing ends. Note that, although the PC 110 obtains the cloud printer ID from the cloud printing service in the present embodiment, a form in which the cloud printer ID is obtained from the data conversion service 320 is also possible.

As explained above, according to the present embodiment, it is possible to suitably obtain status information of a printer. Specifically, the print extension app 180 obtains a cloud printer ID for identifying a printer on the cloud printing system via the OS. Accordingly, the print extension app 180 can obtain and display the status information of the printer at a given timing. Note that, although the case in which the user presses the update button 605 has been described as an example of the given timing in the above embodiment, there is not a limitation as such. For example, updates of the statuses may be automatic. That is, it is also possible that the print extension app 180 automatically performs the update process at predetermined intervals.

OTHER EMBODIMENTS

In the above-described embodiment, although an OS equivalent to Windows (registered trademark) 10 is used as an example of the OS, the OS is not limited to this, and it is possible to use a given OS. Further, in the above-described embodiment, although Ethernet is used as a configuration example of the network 4, the configuration is not limited to this example, and it is also possible to use given another network configuration such as wireless LAN, IEEE1394, Bluetooth (registered trademark), etc.

Further, although the print extension app 180 is used in the above-described embodiment, the configuration is not limited to this example, and the functions related to the present disclosure about the print extension app 180 may be implemented by, for example, an OS standard printer driver.

Further, in the above-described embodiment, the explanation has been given of the example of a configuration in which a personal computer and a printer are connected via the Internet so that printing from the personal computer is performed by the printer. The configuration is not limited to this example, and implementation with such a configuration in which a personal computer and a scanner are connected via the Internet so that a document is read by the scanner from the personal computer is also possible.

Although each embodiment has been described in detail above, the embodiment is not specifically limited, and various transformations and modifications are possible within the range of the gist of the present disclosure.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-026620, filed Feb. 24, 2022, which is hereby incorporated by reference herein in its entirety.

What is claimed is:

1. An information processing apparatus in a printing system including the information processing apparatus, a cloud printing service, a data conversion service, and a printing apparatus that is not compatible with the cloud printing service but can utilize the cloud printing service via the data conversion service, the information processing apparatus comprising:

a memory containing instructions and a processor for executing the instructions to:

obtain printer identification information for identifying the printing apparatus in the cloud printing service; and request the data conversion service for printer status information of the printing apparatus which includes information indicating an ink remaining amount by use of the obtained printer identification information in a case where an update button is pressed on a management screen corresponding to the printing apparatus in a print extension application or at a timing of a predetermined interval; and a display controller configured to perform display control of the obtained printer status information.

2. The information processing apparatus according to claim 1, wherein the display controller displays the printer status information on a web browser, a toast notification, or in a display area of a print extension application.

3. The information processing apparatus according to claim 2, wherein, in a case where the printer status information by assigning the printer identification information to a query parameter of a URL for accessing a display screen of the printer status information which is provided by the data conversion service is requested, the display controller controls a web page of the printer status information corresponding to the printer identification information to be displayed on the web browser or in a display area of a management screen which is provided by the print extension application.

4. The information processing apparatus according to claim 1, wherein a mechanism of IPP Shared Infrastructure Extensions (INFRA) is used to obtain the printer identification information from the cloud printing service or the data conversion service.

5. The information processing apparatus according to claim 1, wherein the printer status information further includes information indicating being online or being offline, or error information.

6. A control method of an information processing apparatus in a printing system including the information processing apparatus, a cloud printing service, a data conversion service, and a printing apparatus that is not compatible with the cloud printing service but can utilize the cloud printing service via the data conversion service, the control method comprising:

obtaining printer identification information for identifying the printing apparatus in the cloud printing service;

requesting the data conversion service for printer status information of the printing apparatus which includes information indicating an ink remaining amount by use of the obtained printer identification information in a case where an update button is pressed on a management screen corresponding to the printing apparatus in a print extension application or at a timing of a predetermined interval; and performing display control of the obtained printer status information.

7. A printing system including an information processing apparatus, a cloud printing service, a data conversion service, and a printing apparatus that is not compatible with the cloud printing service but can utilize the cloud printing service via the data conversion service, wherein the information processing apparatus comprises:

a memory containing instructions and a processor for executing the instructions to:

obtain printer identification information for identifying the printing apparatus in the cloud printing service: and request the data conversion service for printer status information of the printing apparatus which includes information indicating an ink remaining amount by use of the obtained printer identification information in a case where an update button is pressed on a management screen corresponding to the printing apparatus in a print extension application or at a timing of a predetermined interval; and a display controller configured to perform display control of the obtained printer status information.

8. A non-transitory computer readable storage medium storing a program which causes a computer to function as a print extension application for extending a function of printing in a printing system including an information processing apparatus, a cloud printing service, a data conversion service, and a printing apparatus that is not compatible with the cloud printing service but can utilize the cloud printing service via the data conversion service, wherein the information processing apparatus is caused to:

obtain printer identification information for identifying the printing apparatus in the cloud printing service;

request the data conversion service for printer status information of the printing apparatus which includes information indicating an ink remaining amount by use of the obtained printer identification information in a case where an update button is pressed on a management screen corresponding to the printing apparatus in a print extension application or at a timing of a predetermined interval; and perform display control of the obtained printer status information.

* * * * *